Patented Mar. 21, 1939

2,151,371

UNITED STATES PATENT OFFICE 2,151,371

PROCESS FOR PREPARING ACYL DERIVATIVES OF TETRALYLQUINOL

Yasuhiko Asahina, Tokyo, Japan

No Drawing. Application March 12, 1938, Serial No. 195,657. In Japan October 30, 1937

4 Claims. (Cl. 260—396)

This invention relates to a process for preparing derivative of tetralylquinol, which consists of treating tetralylquinol with an acylating agent in an ordinary manner, and the object is to obtain organic esters of the starting material, which is a new substance having an anthelmintic action.

The starting material, tetralylquinol, of this invented process is a new substance having an anthelmintic action, and is prepared by reducing 6-nitrotetralin to 6-hydroxylaminotetralin and treating the latter with a mineral acid, said method being the subject matter of copending application Serial No. 195,656.

According to the inventor's investigation a more effective anthelmintic can be obtained by treating this substance with an acylating agent such as acetyl chloride, glacial acetic acid, acetic acid, benzoylchloride, benzoic anhydride, a mixture of benzoic anhydride and sodium benzoate, thereby producing an organic acid ester of tetralylquinol, for example, acetyl-tetralylquinol and benzyl-tetralylquinol.

Example 1

A mixture of 30 parts of tetralylquinol, 30 parts of anhydrous sodium acetate and 90 parts of acetic anhydride is boiled for about 1 to 1.5 hours, and there is then added a quantity of water whereby acetic anhydride is hydrolysed. The liquid is then decolored by means of charcoal, and 200 to 300 parts of water is further added thereto.

The liquid is shaken with ether repeatedly with ether renewed each time, and all the ether extracts are united and the water contained therein is removed. The solution is subsequently condensed by evaporation and petroleum ether is added thereto whereupon a crystalline precipitate is obtained, which is re-crystallized from ether water or a mixture of ether and petroleum ether.

This product is acetyl-tetralylquinol, the yield being 25 to 30 parts. It is colorless and manifests various crystalline forms, and is easily soluble in ether, alcohol and benzene but difficultly soluble in water. Its melting point is 80° C. to 81° C.

Example 2

A mixture of 2 parts of tetralylquinol, 2 parts of anhydrous sodium benzoate and 10 parts of benzoic anhydride is heated on an oil bath for about one hour at a temperature of 140° C. to 150° C. There is then added about 20 parts water, and the mixture is heated on a boiling water bath with agitation, so that the remaining benzoic anhydride is hydrolysed. After 100 parts water is added the solution is repeatedly shaken with ether, and the extracted ether solution is united and washed with dilute alkali carbonate or alkali hydroxide solution, and the solution is condensed by evaporation whereby a crystalline product is separated which is re-crystallized from ether. The product is benzoyl-tetralylquinol, the yield being about one part, and is colorless and possesses various crystalline forms. It is easily soluble in ether, alcohol and benzol but difficultly soluble in water, and melts at 138° C. to 140° C.

What I claim is:

1. A process for preparing tetralylquinol derivatives having anthelmintic action, which comprises treating tetralylquinol with an acylating agent.

2. The acylated tetralylquinols which are characterized by effective anthelmintic action.

3. Acetyl-tetralylquinol.

4. Benzoyl-tetralylquinol.

YASUHIKO ASAHINA.